United States Patent [19]

Munemura et al.

[11] Patent Number: 4,953,912
[45] Date of Patent: Sep. 4, 1990

[54] STRUCTURE OF A BLIND PANEL WINDOW FOR AN AUTOMOBILE

[75] Inventors: Masahiro Munemura; Kenji Takahashi, both of Tokyo, Japan

[73] Assignee: Fuji Jukogyo Kabushiki Kaisha, Tokyo, Japan

[21] Appl. No.: 385,822

[22] Filed: Jul. 27, 1989

[30] Foreign Application Priority Data

Aug. 5, 1988 [JP] Japan ................ 63-103874

[51] Int. Cl.⁵ .............................................. B60R 27/00
[52] U.S. Cl. ...................................... 296/191; 52/208; 52/397
[58] Field of Search .................. 296/191, 96.21, 93, 296/201; 52/208, 397

[56] References Cited

U.S. PATENT DOCUMENTS 4,332,413 6/1982 Erion .................................. 296/201
4,703,973 11/1987 Fujikawa ............................ 296/201

FOREIGN PATENT DOCUMENTS 136514 8/1983 Japan .................................. 296/201
164223 9/1984 Japan .................................. 296/191
222813 10/1986 Japan .................................. 296/201

Primary Examiner—Margaret A. Focarino
Assistant Examiner—Gary C. Hoge
Attorney, Agent, or Firm—Beveridge, DeGrandi & Weilacher

[57] ABSTRACT

The blind panel is attached by an adhesive to an inner circumferential flange portion of a window frame panel of the automobile in position to externally cover a window frame panel opening. The structure includes the inner frame for supporting the blind panel. The structure is further provided with an adhesive apply portion for receiving the adhesive. A damming member for damming an outward flow of the adhesive is provided between each member.

6 Claims, 1 Drawing Sheet

STRUCTURE OF A BLIND PANEL WINDOW FOR AN AUTOMOBILE

BACKGROUND OF THE INVENTION

1. Field of the Invention

The present invention relates to a structure of a blind panel window for an automobile.

2. Prior Art

Usually, as shown in FIG. 3, a stationary (fixed) window glass A, such as a rear windshield glass or a rear side window glass, of an automobile is joined to the automobile by means of a weather strip C. In a groove of the weather strip C, the glass is fitted. The weather strip is further provided with another groove for inserting the edge of a window frame panel B of the automobile, as illustrated in FIG. 3. In the same method, a blind panel is installed on the panel B. (See Japanese Utility Model Laid Open Publication No. 61(1986)-118,816.) Practically, the weather strip C is fitted around the blind panel A by inserting the circumferential edge of the panel A into the inner groove, and then the blind panel A with the weather strip C is placed on a the circumferential flange portion of the window frame panel B. In this state, the outer groove is manually widened, in which groove the circumferential flange portion of the window frame panel B is fitted. This operation requires rather difficult works and long time.

To overcome such drawbacks, another attempt has been made in which the blind panel A is directly attached to the inner circumferential flange of the window frame panel B by an adhesive D as illustrated in FIG. 4. In this prior art, it is necessary to wipe out some amount of the adhesive which flows out of a bonded portion of the blind panel A, and a jig for holding the blind panel A in position to the window frame panel B is needed until the adhesive is cured. In addition, the prior art is disadvantageous in that rust of the periphery of the blind panel A deteriorates appearance of the window.

Accordingly, it is an object of the present invention to provide a structure of a blind panel window installation for an automobile, which structure overcomes the above mentioned disadvantages.

SUMMARY OF THE INVENTION

With this and other objects in view, the present invention provides a structure of a blind panel window for an automobile. The blind panel is attached by an adhesive to an inner circumferential flange portion of a window frame panel of the automobile in position to externally cover a window frame panel opening defined by the inner circumferential flange portion. The structure includes an inner frame mounted internally to the window frame panel for covering the inner circumferential flange, the inner frame including a supporting mechanism for supporting the blind panel at a predetermined interval from the circumferential flange portion of the window frame panel. The structure is further provided with an adhesive portion defining assembly for defining the portion receiving the adhesive. The adhesive portion includes: a first dam member for circumferentially and resiliently preventing an outward flow of the adhesive between the inner frame and the circumferential flange portion for curing; a second dam member for circumferentially and resiliently preventing an outward flow of the adhesive between the inner frame and the blind panel for curing; and a third dam member for circumferentially and resiliently preventing an outward flow of the adhesive between the blind panel and the circumferential flange portion of the window frame panel for curing.

BRIEF DESCRIPTION OF THE DRAWINGS

The invention will now be described with reference to the accompanying drawings in which.

DETAILED DESCRIPTION OF THE PREFERRED EMBODIMENT

Figure 1:
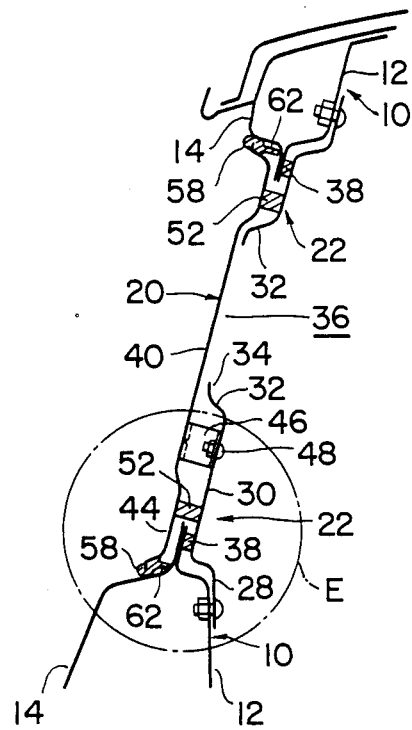
FIG. 1 is a diagrammatic vertical sectional view of a blind panel window mounting structure of the present invention.
Figure 2:
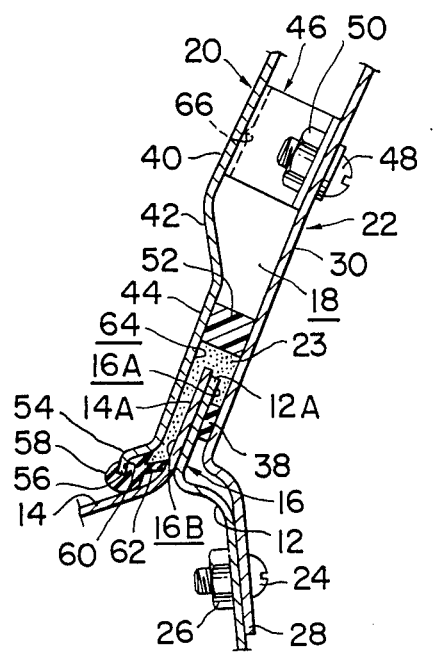
FIG. 2 is an enlarged vertical section of an encircled portion at E in the FIG. 1.
Figure 3:
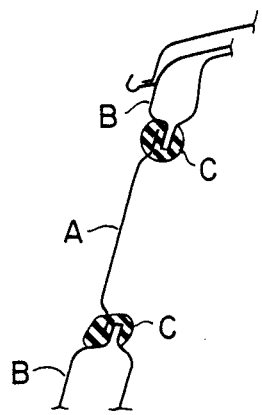
FIG. 3 is a diagrammatic vertical section of the blind panel window mounting structure according to the prior art.
Figure 4:
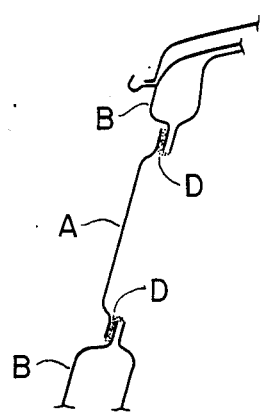
FIG. 4 is a diagrammatic vertical section of another example of the prior art blind panel window mounting structure.

In FIGS. 1 and 2, reference numeral 10 indicates a window frame panel which includes an inner panel 12 and an outer panel 14. The inner and outer panels 12 and 14 have respective continuous or circumferential flanges 12A and 14A which are joined to form a window frame flange 16 which defines a window frame opening 18. The window frame opening 18 is covered with a blind panel 20. The window frame flange 16 has unpainted circumferentially continuous portions 16A, 16B with a width of about 10 mm on its opposite faces along the periphery thereof for improving adhesiveness of an adhesive 23 to bond the blind panel 20 to the window frame panel 10. Each of the unpainted portions 16A, 16B is formed by masking that portion during painting of the window frame panel 10.

The window frame panel 10 is internally covered around the window frame flange 16 with an inner frame 22 which is fastened with several screws 24 and nuts 26 to the inner panel 12. The inner frame 22 has a shape similar to the shape of the window frame opening 18 and includes an outer circumferential portion 28, fastened to the inner panel 12, and an outwardly recessed frame portion 30. The portion 30 is spaced a predetermined distance, for example about 5 mm, from the flange portion 16 of the window frame panel 10, where the outer circumferential portion 28 thereof is fastened to the inner panel 12. The frame portion 30 extends inwardly at a predetermined distance of about 50 mm from the outer circumferential portion 28. The frame portion 30 terminates at its inner periphery in an outwardly protruded inner circumferential portion 32 of which an inner circumferential edge 34 defines an inner frame opening 36, which has a similar shape of the window frame opening 18 and is smaller than the shape of the window frame opening 18. The outwardly protruded inner circumferential portion 32 closely faces the blind panel 20 attached to the window frame panel 10. The outwardly protruded inner circumferential portion 32 projects outwardly from the flange portion 16 of the window frame panel 10 through the window frame opening 18 as illustrated in FIG. 1. The frame portion 30 has a continuous dam strip 38 bonded to an outer surface around the inner frame opening 36 so as to face the flange portion 16 of the window frame panel 10, the dam strip 38 being made of a resilient material, such as a rubber. When the inner frame 22 is fastened to the inner panel 12, the dam strip 38 is resiliently sandwiched between the circumferential frame portion 30 of the inner frame 22 and the flange 12A of the inner panel 12 for preventing the adhesive 23 from flowing outwardly toward a proximal portion of the flange 12A of the inner panel 12. The thickness of the dam strip 38 is substantially equal to the spacing between the frame portion 30 of the inner frame 22 and the flange 12A of the inner panel 12.

The blind panel 20 is externally attached to both the window frame panel 10 and the inner frame 22 to cover the window frame panel opening 18. The blind panel 20 includes a protruded panel portion 40 substantially covering the window frame panel opening 18. Curved inwardly to the peripheral portion of protruded panel portion 40 is a circumferential shoulder 42, which terminates in a circumferential flange 44 with a predetermined width of about 20 mm. The circumferential flange 44 faces the flange 14A of the outer panel 14, where the blind panel 20 is attached to the inner frame 22. The frame portion 30 of the inner frame 22 has a plurality of z-shaped attachment brackets 46 fastened at regular intervals to the frame 22 by means of screws 48 and nuts 50 although only one attachment bracket 46 is shown in FIG. 1. The peripheral portion of the panel portion 40 of the blind panel 20 is attached to the attachment bracket 46 by welding, for example, thereby being spaced a predetermined distance of about 5 mm from the frame portion 30 of the inner frame 22. Another dam strip 52, made of a resilient material, a rubber for example, is bonded on the inner surface of the circumferential flange 44 of the blind panel 20 around the circumferential shoulder 42 of the blind panel 20 so that it is resiliently sandwiched between the circumferential flange 44 and the frame portion 30 of the inner frame 22"for preventing the adhesive 23 from leaking outwardly toward the inner frame opening 36. The gap between the circumferential flange 44 of the blind panel 20 and the frame portion 30 of the inner frame 22 is set a predetermined distance of about 11.4 mm: that is, 5 mm for the gap between the circumferential flange 44 and the flange portion 16 of the window frame panel 10, 5 mm for the gap between the flange portion 16 and the frame portion 30, and 1.4 mm for the thickness of the flange portion 16, each of the inner and outer panels 1a, 1b being 0.7 mm in thickness. The inner surface of the circumferential flange 44 has an unpainted surface formed from the dam member 52 toward the circumferential edge thereof by providing a masking for painting of the blind panel 20. The circumferential flange 44 of the blind panel 20 terminates in a circumferential hook portion 54 extending around it. The hook portion 54 has a circumferential hook edge 56 extending inwardly toward the outer panel 14. A resilient protecting member or a damming member 58, made of a resilient material such as a rubber, is resiliently engaged with the hook edge 56 to surround the edge 56: the resilient protecting member 58 has a circumferential groove 60 formed therein, and the hooking edge 56 is fitted into the circumferential groove 60. The protecting member 58 has a circumferential lip portion 62 extending around the member 58 and projecting inwardly toward the proximal portion of the flange 14A of the outer panel 14 to contact resiliently with the flange 14A for preventing the adhesive 23 from flowing outwards from between the flange 14A of the outer panel 14 and the circumferential flange 44 of the blind panel 10.

The blind panel 20 is attached to the window frame panel 10 as described below. The inner frame 22 is fastened to the inner panel 12 by the screws 24 and nuts 26 as illustrated in FIGS. 1 and 2, so that the dam strip 38 bonded to the outer surface of the frame portion 30 of the inner frame 22 contacts with the flange 12A of the inner panel 12 to prevent the adhesive 23 from flowing into the proximal portion of the flange 12A. Thereafter, the adhesive 23 is applied to the unpainted surface 64 of the blind panel 20 between the dam strip 52 and the protector 58 and is then covered over the flange portion 16 of the window frame panel 10 for joining the attachment brackets 46 by welding as shown at 66 in FIG. 2. Thus, the dam strip 52 prevents the adhesive 23 from flowing toward the center of the window frame panel opening 18, and the lip 62 of the protector 58 keeps it from leaking toward the proximal portion of the outer panel 14. The blind panel 20 is secured to the inner panel 12 through the inner frame 22 and hence no jig for supporting the blind panel 20 at predetermined position relative to the opening 18 of the window frame panel 10 is necessary. Such a securing structure of the blind panel 20 reinforces bonding strength of the adhesive 23 after setting thereof.

The dam strips 38 and 52 and the protector 58 prevents the adhesive 23 from flowing out of the portion 66 of which outlets are closed by these members, thereby improving productivity and appearance of the window. With the supporting of the blind panel 20 on the inner frame 22, any jig for holding the blind panel 20 while the adhesive 23 is curing, is not necessary and the adhesion of the blind panel 20 to the window frame panel 10 is reinforced. The protector 58 conceals rust of the circumferential edge 56 of the blind panel 20 for improving appearance of the blind panel 29.

What is claimed is:

1. In a structure of a blind panel window for an automobile, in which the blind panel is attached by an adhesive to a circumferential flange portion of a window frame panel of the automobile in position to externally cover a window frame panel opening defined by the circumferential flange portion, the blind panel having a peripheral portion, the improvement which comprises:

an inner frame mounted internally to the window frame panel for covering the circumferential flange portion, the inner frame including supporting means for supporting the blind panel at a predetermined interval from the circumferential flange portion of the window frame panel; and adhesive portion defining means for defining a portion receiving the adhesive, first circumferential resilient damming means for damming an outward flow of the adhesive between the inner frame and the circumferential flange portion while curing the adhesive, the first circumferential damming means bridging between the inner frame and the circumferential flange portion and extending along the circumferential flange portion, second circumferential resilient damming means for damming an outward flow of the adhesive between the inner frame and the blind panel until setting of the adhesive, the second circumferential damming means bridging between the inner frame and the blind panel and extending to internally surround the circumferential flange portion of the window frame panel, and third circumferential resilient damming means for damming an outward flow of the adhesive between the blind panel and the circumferential flange portion of the window frame panel while curing the adhesive, the third circumferential damming means being attached to the peripheral portion of the blind panel so as to extend along the peripheral portion.

2. The structure as recited in claim 1, wherein the circumferential flange portion of the window frame panel has an outer surface facing the blind panel, wherein the blind panel includes a circumferential portion having a circumferential edge, the third damming means comprises an elongated protecting member mounted on the circumferential edge of the blind panel to extend around the circumferential edge; and an elongated lip extending to surround the protecting member and projecting from the protecting member to resiliently contact the outer surface of the circumferential flange portion of the window frame panel, and the protecting member having a circumferential groove formed therein, the circumferential edge of the blind panel fitting in the circumferential groove.

3. The structure as recited in claim 2, wherein the circumferential portion of the blind panel includes a circumferential hook portion bending inwardly toward the circumferential flange portion of the window frame panel, the hook portion having a hook edge at the circumferential edge and resiliently fitting into the circumferential groove of the protecting member of the third damming means.

4. The structure as recited in claim 3, wherein the window frame panel comprises an inner panel having an inner circumferential flange and an outer panel having an outer circumferential flange, the circumferential flanges forming the circumferential flange portion;

the first damming means bridges between the inner frame and the circumferential flange; and the third damming means bridges between the hook edge of the hook portion and the outer circumferential flange of the outer panel.

5. The structure as recited in claim 4, wherein the first damming means and the second damming means have a strip shape.

6. The structure as recited in claim 5, wherein the supporting means comprises at least one bracket joining the blind panel and the inner frame together.

* * * * *